United States Patent
Chiang et al.

(10) Patent No.: US 6,823,761 B2
(45) Date of Patent: Nov. 30, 2004

(54) DEVICE FOR STRIPPING COATED OPTICAL FIBER RIBBONS

(75) Inventors: Chung-I Chiang, Taoyuan (TW); Ming-Jen Wang, Tucheng (TW); Kun-Hsien Cheng, Jungli (TW); Hong-Jueng King, Taoyuan (TW); Huei-Pin Huang, Taoyuan (TW); Chwei-Jing Yeh, Sanchung (TW)

(73) Assignee: Alliance Fiber Optics Products, Sunnyvale, CA (US)

( * ) Notice: Subject to any disclaimer, the term of this patent is extended or adjusted under 35 U.S.C. 154(b) by 68 days.

(21) Appl. No.: 10/418,163

(22) Filed: Apr. 18, 2003

(65) Prior Publication Data

US 2004/0055161 A1 Mar. 25, 2004

(30) Foreign Application Priority Data

Apr. 19, 2002 (TW) ........................................ 91108152 A

(51) Int. Cl.$^7$ ................................................ H02G 1/12
(52) U.S. Cl. .......................................... 81/9.51; 81/9.41
(58) Field of Search ................................. 81/9.51, 9.41, 81/9.42

(56) References Cited

U.S. PATENT DOCUMENTS

| 5,681,417 A | * | 10/1997 | Jacobs | 156/344 |
| 5,893,302 A | * | 4/1999 | Strom | 81/9.51 |
| 6,598,497 B1 | * | 7/2003 | Sato et al. | 81/9.41 |

* cited by examiner

Primary Examiner—Derris H. Banks
Assistant Examiner—J Williams
(74) Attorney, Agent, or Firm—Bacon & Thomas PLLC

(57) ABSTRACT

A device for stripping coated optical fiber ribbons, in cooperation with at least an optical fiber ribbon having a protective coating and an optical fiber array substrate having grooves, comprises a heating unit including at least a first trench and a cutting blade for gripping a first portion of the optical fiber ribbon having protective coatings and for heating; a stripping unit having at least a second trench, adjacent to and connected to the first trench, for gripping a second portion of the optical fiber ribbon having the protective coating; a fiber array seat for receiving an optical fiber array substrate; and a linear guiding unit for limitedly guiding the direction of the separation movement between the heating unit and the stripping unit.

8 Claims, 5 Drawing Sheets

DEVICE FOR STRIPPING COATED OPTICAL FIBER RIBBONS

FIELD OF THE INVENTION

The present invention relates to a device for stripping a protective coating, in particular for stripping a coating of optical fiber ribbons in a process for manufacturing optical fiber array module.

BACKGROUND OF THE INVENTION

In recent years, optical fibers are now widely used as medium for transmitting high volume of telecommunication signals. High volume of data can be transmitted with high-speed through the help of high-channel-count planar waveguide components and dense wavelength demux/multiplexer (DWDM) device. Optical communication can also meet the requirement of high speed and wideband in the internet communication. The high-channel-count planar waveguide component is usually connected to the related optoelectronic components by optical fiber array. In most cases, there is a polymer protective layer on the outer surface of the optical fiber ribbon of the optical fiber array. Usually, the outer polymer of the optical fibers is individually removed before the optical fibers are mounted on a substrate. The optical fibers are then aligned with grooves on the substrate and held or bound in the grooves. Because the optical fibers are so delicate, it is hard to align and to control the movement of the optical fibers on the V-grooves of the substrate after stripping the polymer protective coating. Therefore, there is a need to improve the conventional manufacture process in which the protective coating is separately stripped, and then an aligning position is made.

Therefore, it is desirable to provide an improved device for stripping coated optical fiber ribbons to mitigate and/or obviate the aforementioned problems.

SUMMARY OF THE INVENTION

The primary object of the present invention is to provide a device for stripping coated optical fiber ribbons effectively, simplifying the separation of the protective coating from the optical fibers, locating and aligning the optical fibers on grooves of an optical fiber array substrate used to hold the optical fiber, and thus to simplify the manufacture process for optical fiber array module.

To achieve the aforesaid object, a device for stripping coated optical fiber ribbons according to the present invention, in cooperation with at lest an optical fiber ribbon having a protective coating and an optical fiber array seat having grooves, comprises a heating unit having at least a first trench for locating and gripping a first portion of said optical fiber ribbon having said protective coating wherein said first portion of said optical fiber ribbon is heated; a stripping unit having at least a second trench, adjacent to and connected to said first trench, for gripping and locating a second portion of said optical fiber ribbon having said protective coating, wherein said stripping unit is used to separate the protective coating from said optical fiber ribbon through moving; at least a cutting blade, mounted on said heating unit or on said stripping unit, for separating said optical fiber ribbon into said first portion and said second portion through cutting and peeling off or remove said protective coating of said optical fiber ribbon; a fiber array seat for receiving and retaining an optical fiber array substrate wherein said optical fiber array seat is mounted in a hollow cavity of said heating unit or of said stripping unit; and a linear guiding unit for limiting and guiding the direction of the separation movement between said heating unit and said stripping unit; wherein said optical fiber array substrate springing to and beneath said peeled optical fibers without the protective coating through the help of the movement of said fiber array seat when the protective coating of said optical fiber ribbon is removed by said stripping unit, and said optical fibers are aligned in said grooves on said optical fiber array substrate.

Other objects, advantages, and novel features of the invention will become more apparent from the following detailed description when taken in conjunction with the accompanying drawings.

DETAILED DESCRIPTION OF THE PREFERRED EMBODIMENT

The device for stripping coated optical fiber ribbons according to the present invention can further comprise an elastic unit to assist the separate movement between the stripping unit and the heating unit, or to spring out said fiber array seat when said heating unit separates from said stripping unit so that said grooves of said optical fiber array substrate is aligned with said first trench of said heating unit. Preferably, the elastic unit is a spring. The device for stripping coated optical fiber ribbons according to the present invention can selectively further comprise at least an auxiliary cutting blade for assisting the main cutting blade to peel off the protective coating of said optical fiber ribbon. The cutting blade of the device according to the present invention may be disposed on the stripping unit, the heating unit or both. Preferably, the cutting blade is set up on the heating unit. The optical fiber array seat of the device according to the present invention can be fixed in the cavity either in the heating unit or in the stripping unit before separation. The fiber array seat with the substrate springs from a hollow cavity of the heating unit, accompanied by the movement of the stripping unit, when the heating unit is separated from the stripping unit. It means that said fiber array seat is mounted in the cavity of said heating unit and moves out of said heating unit during the separation movement between said heating unit and said stripping unit. Or alternatively, the fiber array seat of the device for stripping coated optical fiber ribbons according to the present invention is fixed to the stripping unit, and thus, the fiber array seat springs from a hollow cavity of the stripping unit, accompanied by the movement of the heating unit, when the stripping unit is separated from the heating unit. (FIG. 6) In other words, the fiber array seat is mounted in the cavity of the stripping unit wherein the fiber array seat springs from the stripping unit when the heating unit separates from the stripping unit. The guiding unit of the device for stripping coated optical fiber ribbons is not limited. Preferably, it is a combination of a guide rod and a guide channel.

Figure 1:
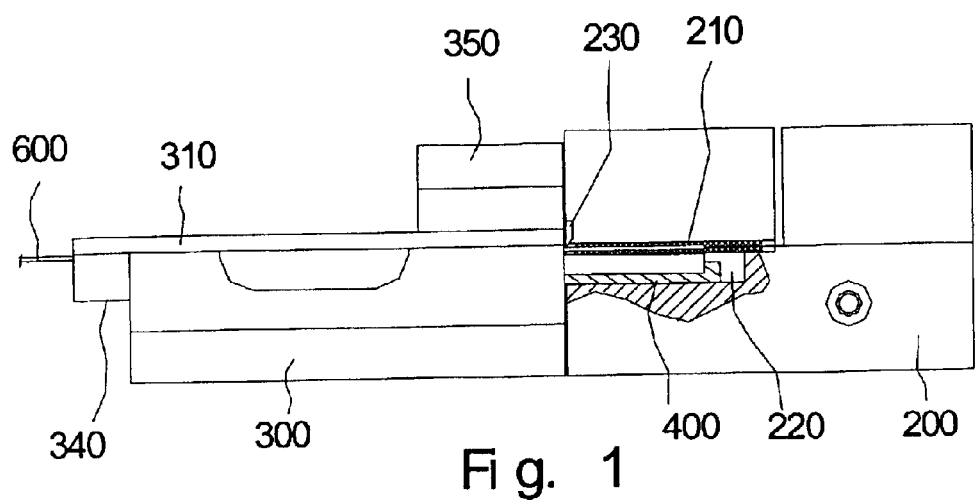
FIG. 1 is a side view of a device for stripping a coated optical fiber ribbon according to a preferred embodiment of the present invention.
Figure 2:
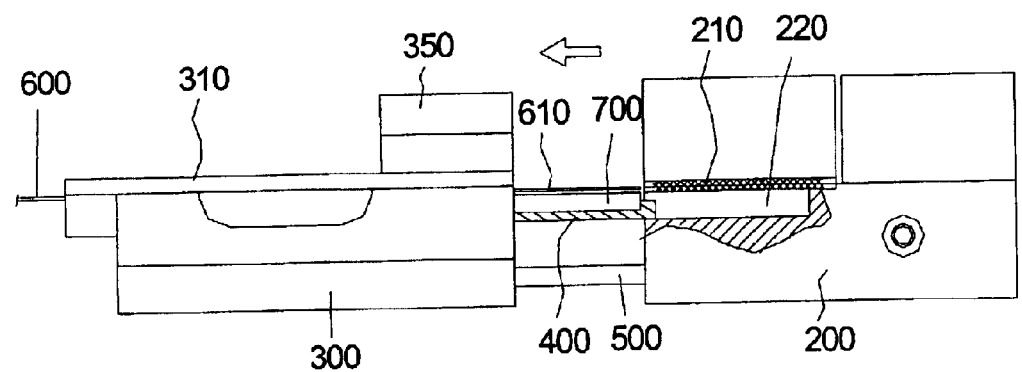
FIG. 2 is a schematic view of a device for stripping a coated optical fiber ribbon according to a preferred embodiment of the present invention.

The invention will be described specifically with reference to FIGS. 1 to 5. FIGS. 1 and 2 are schematic views of a preferred embodiment of the device for stripping coated optical fiber ribbons according to the present invention. The device 100 for stripping coated optical fiber ribbon of the present invention comprises a heating unit 200, a stripping unit 300, a fiber array seat and a guide rod 500. The heating unit 200 includes at least a stripping holder 210 having at least one first trench 212 to grip a coated optical fiber ribbon 600 and peel off the end portion of the coating of the optical fiber 610. The number of the first trenches is not limited. In the present embodiment, there is a first trench 212 on the heating unit 200. The end portion of the coating of the optical fiber 610 is heated after the optical fiber ribbon 600 is mounted on the first trench 212. The purpose of the heating is to soften the protective polymer coated on the outer surface of the optical fiber ribbon 600. In the heating unit 200, a cutting blade 230 is set to cut the protective polymer of the optical fiber ribbon 600 for a certain thickness of the surface layer of the optical fiber ribbon 600. The cutting depth of the protective polymer is predetermined to assist the removal of the protective polymer softened by heat without causing any damage to the optical fiber inside the protective polymer.

The stripping unit 300 of the preferred embodiment has a holder 310. The holder 310 includes a gripping base 340 having a second trench 330 to receive the optical fiber ribbon 600. In addition, the holder 310 has a movable lid 350 corresponding to the gripping base 340 to grip the optical fiber ribbon 600 by closing the movable lid 350 after the optical fiber ribbon 600 is mounted.

The fiber array seat 400 of the optical fiber array of the preferred embodiment of the present invention is a seat mounted in the hollow cavity 220 of the heating unit 200 to dispose an optical fiber array substrate 700. The fiber array seat 400 is firmly connected to the stripping unit 300, and moves out together with the stripping unit 300 as the stripping unit 300 moves. The length of the fiber array seat 400 is sufficient to receive the optical fiber array substrate 700. A portion of the optical fiber 610 of the optical fiber ribbon 600 is exposed after the protective polymer is stripped by the stripping unit 300 and the heating unit 200. The exposed portion of the optical fiber 610 can then be put into the optical fiber array substrate 700, and disposed between the stripping unit 300 and the heating unit 200 without effecting the close movement between the stripping unit 300 and the heating unit 200 as well as the softening and removal of the protective polymer on the outer surface of the optical fiber ribbon 600. The movement of the stripping unit 300 will cause the fiber array seat 400 to move jointly. The related movement of the fiber array seat 400 and the stripping unit 300 connected thereto begins when the stripping unit 300 is separated from the heating unit 200. As such, the optical fiber array substrate 700 moves to the position beneath the optical fiber 610 without the protective polymer. Thus, the naked optical fibers 610, i.e. the optical fibers being exactly peeled off, are laid above an array of grooves 710 of the optical fiber array substrate 700. Furthermore, the optical fibers 610 are located in the grooves 710 of the optical fiber array substrate in an alignment manner. Accordingly, the protective coating of the optical fiber ribbon is stripped, and simultaneously, the optical fiber is aligned with the corresponding grooves of the optical fiber array substrate.

In protective coating stripping of optical fiber ribbons of the preferred embodiment, the heating unit 200 and the stripping unit 300 are separated form each other at the beginning. Then, the stripping unit 300 and the heating unit 200 move close to each other after the optical fiber array substrate 700 is placed into the fiber array seat 400. The fiber array seat 400 embeds in the hollow cavity of the heating unit 200 when the stripping unit 300 is pushed forward the heating unit 200. Then, the lip 350 of the stripping unit 300 is opened. A plurality of optical fiber ribbons 600 having protective polymer are placed into the heating unit 200 and the second trench 330 of the stripping unit 300, and subsequently, the lid 350 is closed. The polymer becomes soften through the heating by the heating unit 200. Subsequently, the stripping unit 300 and the heating unit 200 are pulled apart. The protective polymer between the stripping unit 300 and the heating unit 200 is then removed by the cutting and the movement of the cutting blade 230. (FIGS. 6(A) and 6(B)) The stripping unit 300 moves away from the heating unit 200 in a direction limited by the guide rod 500. The fiber array seat 400 connected to the stripping unit 300 is pulled out together with the separation movement of the stripping unit 300 from the heating unit 200. (FIG. 6(B)) The protective coating of the optical fiber ribbon remains inside the heating portion 210 through the clamping of the heating portion 210 while the drawing of the stripping unit 300 pulls out the optical fiber portion 610. Also, the optical fiber 610 without the protective coating is adequately placed between the stripping unit 300 and the heating unit 200. Because the related movement caused by the stripping unit 300, the optical fiber array substrate 700 is positioned beneath the optical fiber 610 without the protective coating. Especially the grooves 710 of the fiber array substrate 700 are right positioned beneath of the optical fiber 610 without the protective coating. (FIGS. 6(C) or 6 (D)) Accordingly, the stripping of the protective coating of the optical fiber ribbon is simultaneous with the alignment of the optical fiber without the protective coating to the optical fiber array substrate. This simplifies the process for the optical fiber array module and increases productivity and yield.

Figure 3:
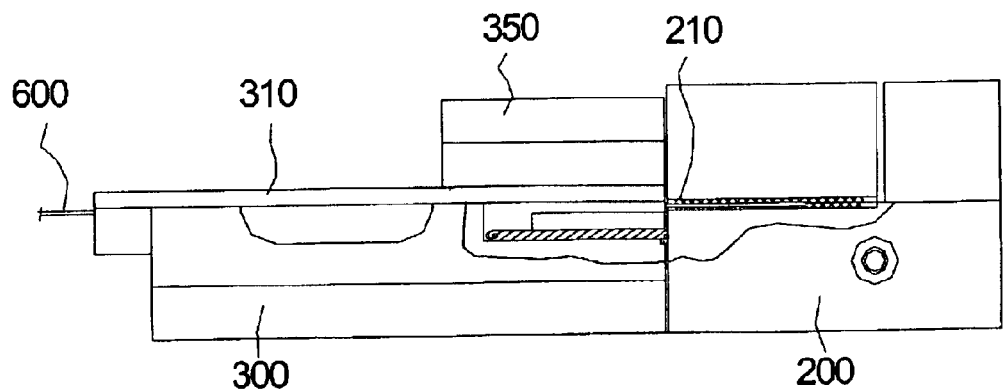
FIG. 3 is a side view of a device for stripping a coated optical fiber ribbon according to another preferred embodiment of the present invention.
Figure 4:
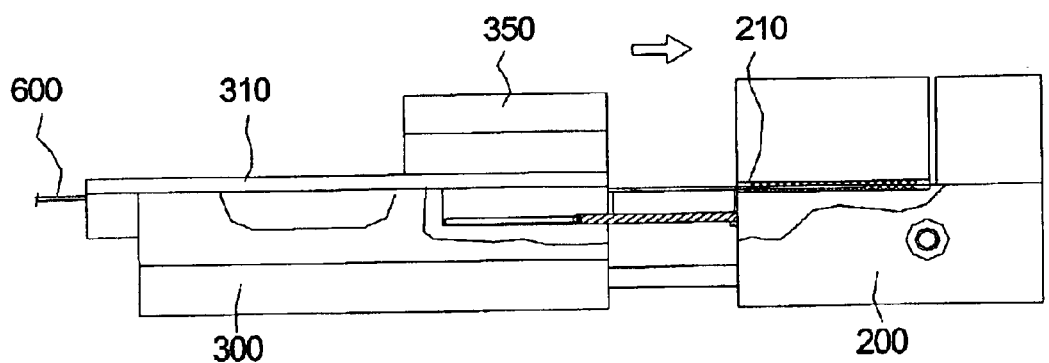
FIG. 4 is a schematic view of a device for stripping a coated optical fiber ribbon according to another preferred embodiment of the present invention.
Figure 5:
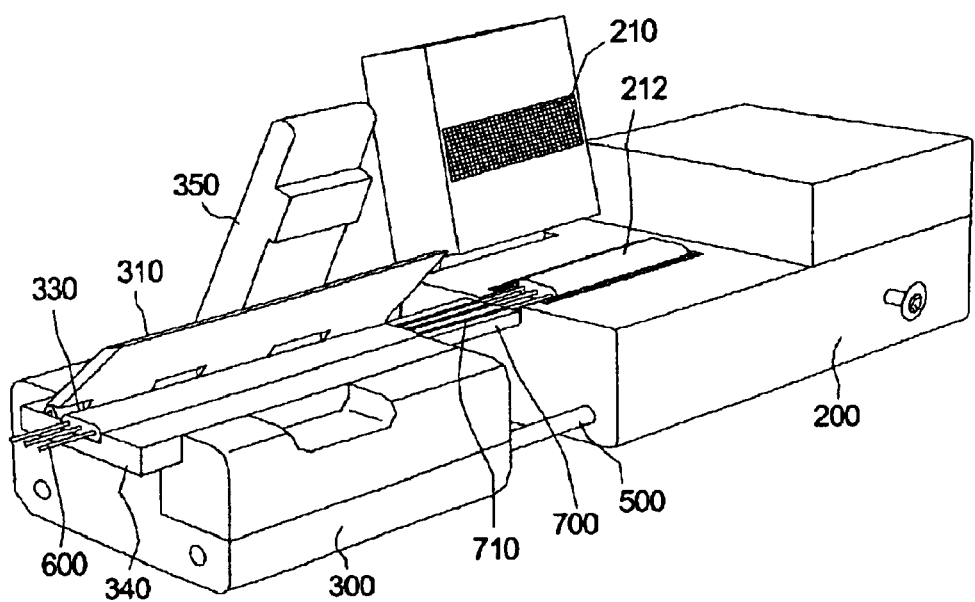
FIG. 5 is a perspective view of a device for stripping a coated optical fiber ribbon according to the present invention.
Figure 6A:
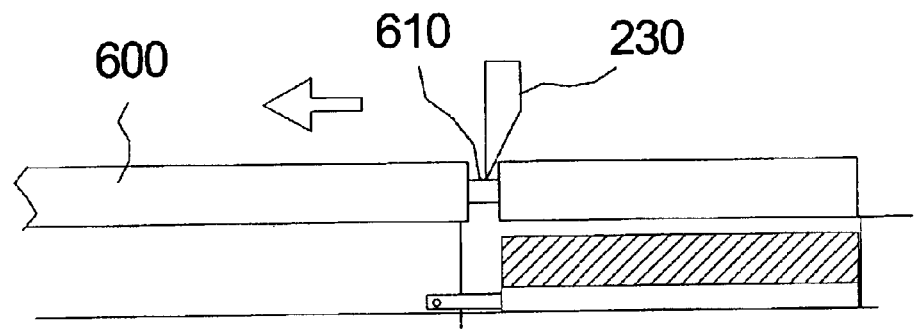
FIG. 6 is a schematic diagram showing the relative movement among the cutting blade for stripping a coated optical fiber ribbon, the retaining seat and the optical fiber array substrate.
Figure 6B:
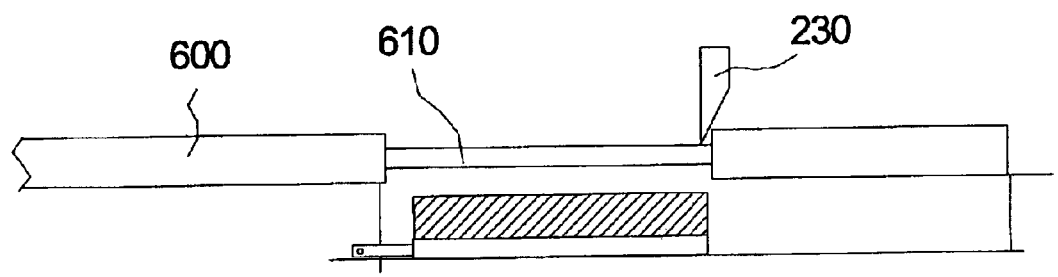
Figure 6C:
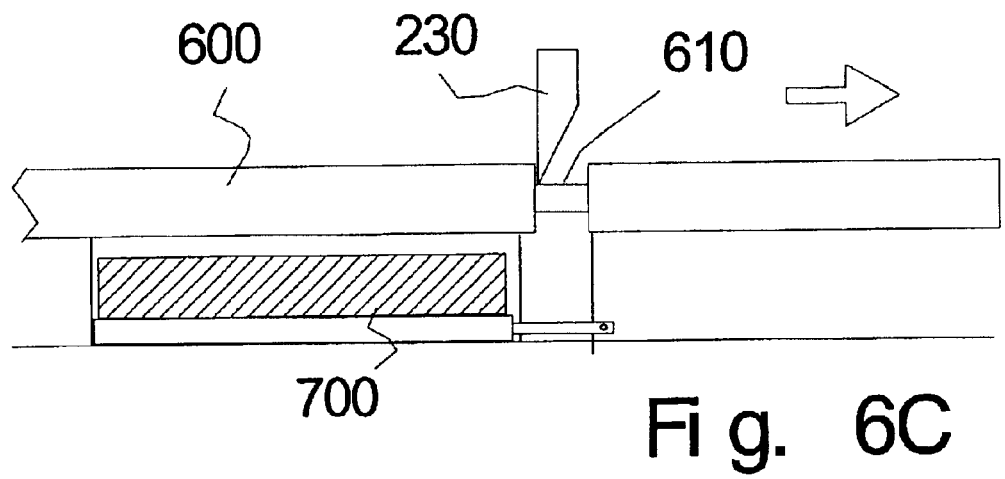
Figure 6D:
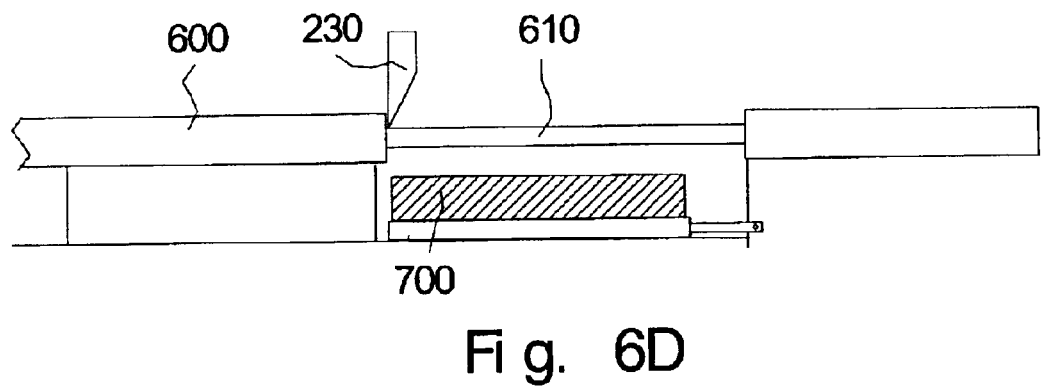

FIGS. 3 and 4 are schematic views of another preferred embodiment of the device for stripping coated optical fiber ribbons according to the present invention. The device for stripping coated optical fiber ribbons of this preferred embodiment also comprises a heating unit 200, a stripping unit 300, an optical fiber array fiber array seat 400 and a guide rod 500. Difference of this preferred embodiment from the aforesaid embodiment in configuration is the fiber array seat 400 is disposed in a hollow cavity 220 of the stripping unit 300 and moved together with the movement of the heating unit 200 when the heating unit 200 moves away from the stripping unit 300. Except for this difference, the movements and operations of this preferred embodiment are the same as those of the previous preferred embodiment. In the case that the heating unit 200 is immobile, the same is true for the fiber array seat 400. After the movement of the heating unit 200, the fiber array seat 400 springs with the optical fiber array substrate 700 as a result of the separation movement of the stripping unit 300. The optical fiber array substrate 700 is positioned beneath the optical fiber 610 without the protective coating; and also, the optical fiber 610 without the protective coating is aligned with the grooves 710 of the optical fiber array substrate 700.

Another preferred embodiment of the device for stripping coated optical fiber ribbons according to the present invention has the same construction as the aforesaid preferred embodiment, except for the positions where the cutting blade and the hollow cavity are located. The cutting blade of this preferred embodiment is disposed on the stripping unit and close to the position between the heating unit and the stripping unit. After heating the protective coating of the optical fiber ribbon by the heating unit, the protective coating of the optical fiber ribbon is cut to a depth to the surface of the optical fiber. The cutting thickness is predetermined to assist the separation of the protective polymer being softened after heating and prevent causing damage to the optical fiber inside the protective coating. The operations of this preferred embodiment is the same as the preferred embodiment just mentioned above.

According to the device of the present invention, the removal of the protective polymer of optical fiber ribbons and the alignment of the optical fiber to the grooves of the optical fiber array substrate are complete simultaneously, which in cooperation with the following processes such as gluing and curing can achieve the objectives of automatic production, simplify the process and increase the yield of alignment. Therefore, the device of the present invention is superior to the known device in many respects as described above.

Although the present invention has been explained in relation to its preferred embodiment, it is to be understood that many other possible modifications and variations can be made without departing from the spirit and scope of the invention as hereinafter claimed.

What is claimed is:

1. A device for stripping coated optical fiber ribbon, in cooperation with at least a coated optical fiber ribbon having a protective coating and a fiber array substrate having a plurality of grooves, comprising:

a heating unit having at least a first trench for locating and gripping a first portion of said optical fiber ribbon having said protective coating wherein said first portion of said optical fiber ribbon is heated;

a stripping unit having at least a second trench, adjacent to and connected to said first trench, for gripping and locating a second portion of said optical fiber ribbon having said protective coating, wherein said stripping unit is used to separate the protective coating from said optical fiber ribbon through moving;

at least a cutting blade, mounted on said heating unit or on said stripping unit, for separating said optical fiber ribbon into said first portion and said second portion through cutting and peeling off or remove said protective coating of said optical fiber ribbon;

a fiber array seat for receiving and retaining an optical fiber array substrate wherein said optical fiber array seat is mounted in a hollow cavity of said heating unit or of said stripping unit; and a linear guiding unit for limiting and guiding the direction of the separation movement between said heating unit and said stripping unit;

wherein said optical fiber array substrate springing to and beneath said peeled optical fibers without the protective coating through the help of the movement of said fiber array seat when the protective coating of said optical fiber ribbon is removed by said stripping unit, and said optical fibers are aligned in said grooves on said optical fiber array substrate.

2. The device for stripping a coated optical fiber ribbon as claimed in claim 1, further comprising an elastic unit to spring out said fiber array seat when said heating unit separates from said stripping unit so that said grooves of said optical fiber array substrate is aligned with said first trench of said heating unit.

3. The device for stripping a coated optical fiber ribbon as claimed in claim 1, further comprising at least an auxiliary cutting blade for peeling off the protective coating of said optical fiber ribbon.

4. The device for stripping a coated optical fiber ribbon as claimed in claim 1, wherein said fiber array seat is mounted in said cavity of said stripping unit wherein said seat springs from said stripping unit when said heating unit separates from said stripping unit.

5. The device for stripping a coated optical fiber ribbon as claimed in claim 1, wherein said fiber array seat is mounted in the cavity of said heating unit and moves out of said heating unit during the separation movement between said heating unit and said stripping unit.

6. The device for stripping a coated optical fiber ribbon as claimed in claim 2, wherein said elastic unit is a spring.

7. The device for stripping a coated optical fiber ribbon as claimed in claim 2, wherein said guiding unit is a combination of a guide rod and a guide channel.

8. The device for stripping a coated optical fiber ribbon as claimed in claim 1, wherein said cutting blade for removing the protective coating of said optical fiber ribbon is mounted on said heating unit.

* * * * *